United States Patent
VandenBerg, III

(10) Patent No.: US 10,248,121 B2
(45) Date of Patent: Apr. 2, 2019

(54) MACHINE-LEARNING BASED AUTONOMOUS VEHICLE MANAGEMENT SYSTEM

(71) Applicant: Uber Technologies, Inc., San Francisco, CA (US)

(72) Inventor: Dirk John VandenBerg, III, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 69 days.

(21) Appl. No.: 15/475,228

(22) Filed: Mar. 31, 2017

(65) Prior Publication Data

US 2018/0284770 A1 Oct. 4, 2018

(51) Int. Cl.
| | | |
|---|---|---|
| *G05D 1/00* | (2006.01) | |
| *G01C 21/26* | (2006.01) | |
| *G01C 21/34* | (2006.01) | |
| *G06N 99/00* | (2019.01) | |
| *G05D 1/02* | (2006.01) | |

(52) U.S. Cl.
CPC ......... *G05D 1/0088* (2013.01); *G05D 1/0221* (2013.01); *G06N 99/005* (2013.01); *G05D 1/0231* (2013.01); *G05D 1/0257* (2013.01)

(58) Field of Classification Search
CPC ...... G05D 1/00; G05D 1/0088; G05D 1/0221; G05D 1/0231; G05D 1/0257; G06N 99/00; G06N 99/005; G08G 1/16; G01C 21/26; G01C 21/34
See application file for complete search history.

(56) References Cited

U.S. PATENT DOCUMENTS

| | | | | |
|---|---|---|---|---|
| 8,660,734 | B2 * | 2/2014 | Zhu ........................ | G06T 7/223 701/23 |
| 9,507,346 | B1 * | 11/2016 | Levinson ............. | G05D 1/0214 |
| 9,612,123 | B1 * | 4/2017 | Levinson ............... | G01C 21/32 |
| 9,958,864 | B2 * | 5/2018 | Kentley-Klay ........ | G01C 21/26 |

(Continued)

OTHER PUBLICATIONS

Kottke, "Phantom Intersections. Traffic Snakes, and the Simple Solution to Traffic", http://kottke.org/16/09/phantom-intersections-traffic-snakes-and-the-simple-solution-to-traffic. Sep. 9, 2016, accessed on Jan. 25, 2017—1 page.

*Primary Examiner* — Yonel Beaulieu
(74) *Attorney, Agent, or Firm* — Dority & Manning, P.C.

(57) ABSTRACT

Systems and methods for managing autonomous vehicles to address traffic anomalies are provided. In one example embodiment, a method includes detecting, by one or more computing devices, an existence of a traffic anomaly within a geographic area. The method includes determining, by the one or more computing devices, at least one autonomous vehicle to address the traffic anomaly within the geographic area. The method includes providing, by the one or more computing devices, a communication to the at least one autonomous vehicle instructing the autonomous vehicle to enter into a traffic reduction operation mode to address the traffic anomaly. The traffic reduction operation mode is based at least in part on a profile associated with the traffic reduction operation mode. The profile associated with the traffic reduction operation mode is stored onboard the autonomous vehicle. The autonomous vehicle is configured to operate in the traffic reduction operation mode.

20 Claims, 6 Drawing Sheets

(56) References Cited

U.S. PATENT DOCUMENTS

| | | | |
|---|---|---|---|
| 2014/0136045 A1* | 5/2014 | Zhu | G06T 7/223 |
| | | | 701/23 |
| 2017/0316698 A1* | 11/2017 | Stenneth | G06F 11/0793 |
| 2018/0209805 A1* | 7/2018 | Rakah | G08G 1/005 |
| 2018/0209806 A1* | 7/2018 | Rakah | G08G 1/005 |
| 2018/0211186 A1* | 7/2018 | Rakah | G08G 1/005 |

* cited by examiner

MACHINE-LEARNING BASED AUTONOMOUS VEHICLE MANAGEMENT SYSTEM

FIELD

The present disclosure relates generally to using machine-learned model(s) to improve the management of autonomous vehicles to address traffic anomalies.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of managing autonomous vehicles to address traffic anomalies. The method includes detecting, by one or more computing devices, an existence of a traffic anomaly within a geographic area. The method includes determining, by the one or more computing devices, at least one autonomous vehicle to address the traffic anomaly within the geographic area. The method includes providing, by the one or more computing devices, a communication to the at least one autonomous vehicle instructing the autonomous vehicle to enter into a traffic reduction operation mode to address the traffic anomaly. The traffic reduction operation mode is based at least in part on a profile associated with the traffic reduction operation mode. The profile associated with the traffic reduction operation mode is stored onboard the autonomous vehicle. The autonomous vehicle is configured to operate in the traffic reduction operation mode.

Another example aspect of the present disclosure is directed to a computing system for managing autonomous vehicles to address traffic anomalies. The system includes one or more processors and one or more tangible, non-transitory, computer readable media that collectively store instructions that when executed by the one or more processors cause the computing system to perform operations. The operations include detecting an existence of a traffic anomaly within a geographic area. The operations include identifying a plurality of autonomous vehicles that are proximate to the geographic area. The operations include determining at least one autonomous vehicle to address the traffic anomaly. The operations include providing a communication to the at least one autonomous vehicle instructing the autonomous vehicle to enter into a traffic reduction operation mode. The traffic reduction operation mode is based at least in part on a profile stored onboard the autonomous vehicle. The profile is based at least in part on a machine-learned model.

Yet another example aspect of the present disclosure is directed to an autonomous vehicle. The autonomous vehicle includes a profile associated with a traffic reduction operation mode stored onboard the autonomous vehicle. The profile includes one or more vehicle actions and one or more vehicle action parameters associated with the one or more vehicle actions. The autonomous vehicle includes one or more processors and one or more tangible, non-transitory, computer readable media that collectively store instructions that when executed by the one or more processors cause the computing system to perform operations. The operations include receiving, from a remote computing device that is remote from the autonomous vehicle, a communication instructing the autonomous vehicle to enter into the traffic reduction operation mode. The operations include accessing data indicative of the profile associated with the traffic reduction operation mode stored onboard the autonomous vehicle. The operations include determining a motion plan for the autonomous vehicle based at least in part on the profile associated with the traffic reduction operation mode.

Other example aspects of the present disclosure are directed to systems, methods, vehicles, apparatuses, tangible, non-transitory computer-readable media, user interfaces, and memory devices for managing autonomous vehicles to address traffic anomalies.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
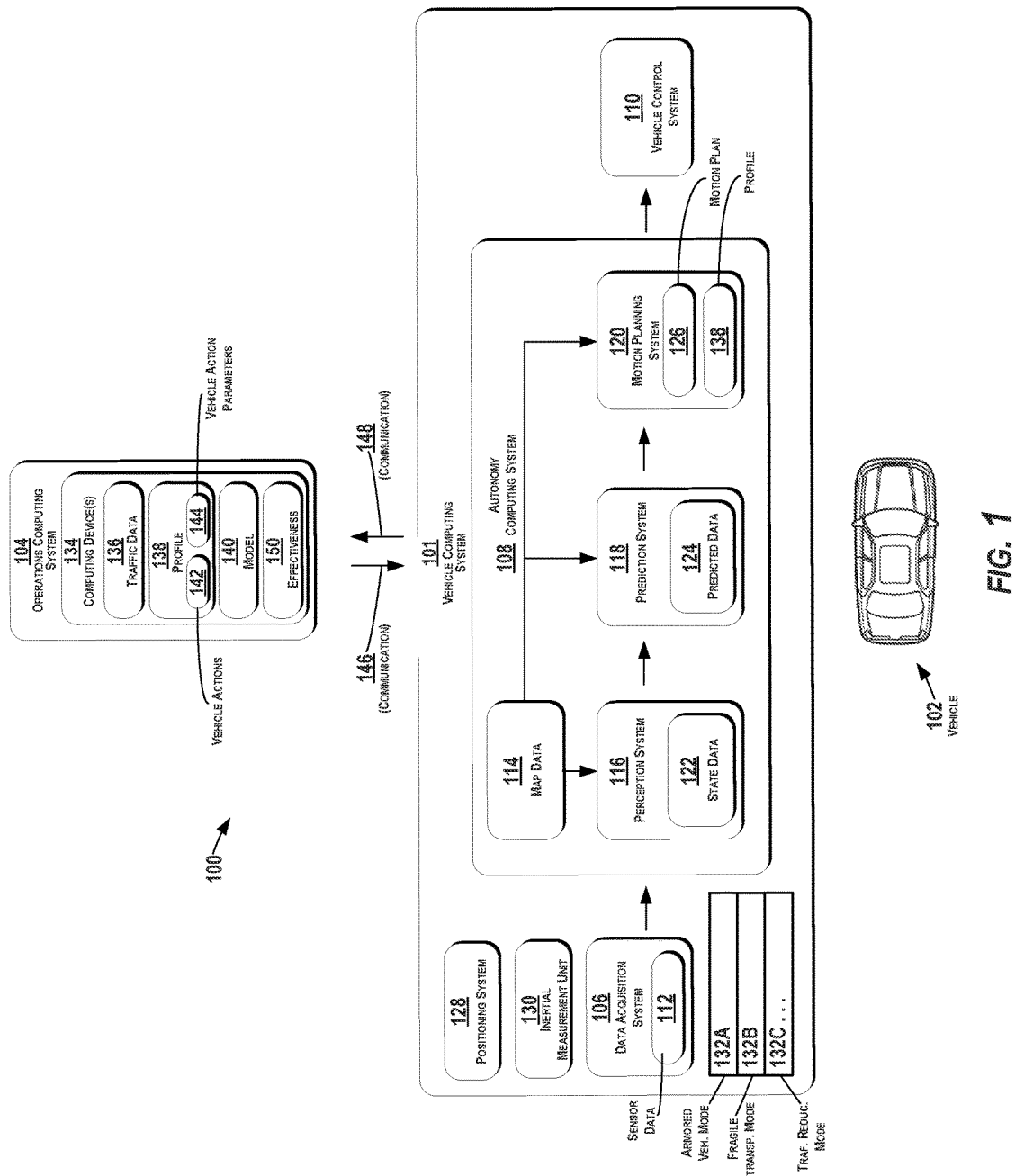
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to managing autonomous vehicles to address traffic anomalies within a geographic area. For instance, a service provider can use a fleet of vehicles to provide a vehicle service (e.g., rideshare service) to a plurality of users. The fleet can include, for example, autonomous vehicles that can drive, navigate, operate, etc. with minimal and/or no interaction from a human driver. The service provider can manage the autonomous vehicles via a remote operations computing system. The autonomous vehicles can be configured to operate in a plurality of modes. The operations computing system can select the operation mode of the autonomous vehicle depending on the objective the service provider is attempting to accomplish.

For example, the operations computing system can manage the fleet of autonomous vehicles to address a traffic anomaly (e.g., stop-and-go traffic snake, gridlock, phantom intersection, etc.) within a geographic area. The operations computing system can monitor the current traffic within the geographic area to identify the occurrence of a traffic anomaly. The operations computing system can select at least one autonomous vehicle within the fleet to help address the traffic condition. For instance, the operations computing system can provide a communication instructing the autonomous vehicle to enter into a traffic reduction operation mode. To do so, the autonomous vehicle can access a profile associated with the traffic reduction operation mode. As further described herein, the profile can be generated based at least in part on a machine-learned model. The profile can include a plurality of vehicle actions and vehicle action parameters designed to address a traffic anomaly. For example, the parameters can specify a speed range, an acceleration rate, a following distance, etc. for the autonomous vehicle to help break-up the traffic anomaly within the geographic area. The autonomous vehicle can generate its motion plan based at least in part on the profile and travel in a manner to help diminish the traffic anomaly. Several autonomous vehicles can be deployed in a similar manner to further diminish the traffic anomaly until it is eliminated. In this way, the service provider can utilize its autonomous vehicle fleet to address traffic conditions that may affect the fleet's ability to provide vehicle services.

More particularly, a service provider can use a fleet of vehicles (e.g., ground-based vehicles) to provide a vehicle service such as a transportation service (e.g., rideshare service), a courier service, a delivery service, etc. The fleet can include autonomous vehicles configured to operate in a fully autonomous manner such that the vehicle can drive, navigate, operate, etc. with no interaction from a human driver. The autonomous vehicle can also operate semi-autonomously with some interaction from a human driver present in the vehicle.

An autonomous vehicle can include a vehicle computing system that implements a variety of systems on-board the autonomous vehicle. For instance, the vehicle can include one or more sensors (e.g., light detection and ranging (LIDAR) sensors, radio detection and ranging (RADAR) sensors, cameras, ultrasonic sensors etc.), an autonomy system (e.g., for determining autonomous navigation), one or more vehicle control systems (e.g., for controlling braking, steering, powertrain), GPS system, inertial measurement unit (IMU), etc. The sensor(s) can gather sensor data (e.g., image data, RADAR data, LIDAR data) associated with one or more object(s) that are proximate to the autonomous vehicle (e.g., within a field of view of the sensor(s)). The object(s) can include, for example, other vehicles traveling in the current travel lane of the autonomous vehicle, vehicles traveling in an adjacent travel lane, vehicles that may enter the current travel lane of the autonomous vehicle, etc. The sensor data can be indicative of characteristics (e.g., locations) associated with the object(s) at one or more times. The sensor(s) can provide such sensor data to the vehicle's autonomy system.

The autonomy system can be a computing system that includes various sub-systems that cooperate to perceive the surrounding environment of the autonomous vehicle and determine a motion plan for controlling the motion of the autonomous vehicle. For instance, the autonomy system can include a perception system, a prediction system, and a motion planning system.

The perception system can process the sensor data from the data acquisition system(s) to detect the one or more objects that are proximate to the autonomous vehicle as well as state data associated therewith. The state data for each object can describe an estimate of the object's current location (also referred to as position), current speed/velocity, current acceleration, current heading, current orientation, size/footprint, class (e.g., vehicle class vs. pedestrian class vs. bicycle class), and/or other state information. The perception system can output data indicative of the state data for each object to the prediction system.

The prediction system can create predicted data associated with one or more of the objects. The predicted data can be indicative of one or more predicted future locations of each respective object. In particular, the predicted data can indicate a predicted path associated with each object. The predicted path can be indicative of a trajectory along which the respective object is predicted to travel over time (and/or the speed at which the object is predicted to travel along the predicted path). The prediction system can provide the predicted data associated with the one or more objects to the motion planning system to help generate a motion plan for the vehicle (e.g., based on a cost data analysis).

An autonomous vehicle can be configured to operate in one or more operational modes. An operational mode can be based at least in part on the objective of the service provider that manages the vehicle fleet. For example, the autonomous vehicle can operate in an armored vehicle mode in which the vehicle minimizes the number of stops during travel. Additionally, or alternatively, the autonomous vehicle can operate in a fragile transport mode, during which the vehicle minimizes the number of higher speed turns, speed bumps, etc. The autonomous vehicle can also operate in a traffic reduction operation mode to help address a traffic anomaly, as further described herein. The service provider can utilize an operations computing system (e.g., that is remote from the autonomous vehicles) to manage the fleet of vehicles, such as to select the appropriate operation mode for the autonomous vehicle. For example, the operations computing system can select the traffic reduction operation mode of the autonomous vehicles to address particular traffic anomalies.

The operations computing system can obtain traffic data from the autonomous vehicles. For example, an autonomous vehicle can provide traffic data associated with the autonomous vehicle to the operations computing system (e.g., periodically, as scheduled, in real-time, near real-time) as the autonomous vehicle travels within a geographic area. In some implementations, the traffic data can be associated with the motion of the autonomous vehicle. For instance, the traffic data can be indicative of the acceleration rate, speed, stopped time, location, and/or other conditions of the autonomous vehicle (e.g., based on GPS system data, inertial measurement unit data, etc.). By way of example, in the event that the autonomous vehicle is traveling within a traffic snake, the traffic data can be indicative of the autonomous vehicle's acceleration/deceleration rate (e.g., registered by the IMU) as it travels according to the traffic snake. In some implementations, the traffic data can include data associated with the surrounding environment of the autonomous vehicle. For instance, the traffic data can include the sensor data, state data, and/or predicted data associated with the objects proximate to the autonomous vehicle (e.g., the other vehicles travelling within the traffic snake). In some implementations, the operations computing system can obtain traffic data from other sources (e.g., a traffic monitoring service).

The operations computing system can build a profile associated with the traffic reduction operation mode of the autonomous vehicle to help the autonomous vehicle operate in a manner that effectively addresses a traffic anomaly. To do so, the operations computing system can include, employ, and/or otherwise leverage a model. In particular, the model can be a machine-learned model. For example, the machine-learned model can be or can otherwise include one or more various model(s) such as, for example, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model to develop recommended vehicle actions that help diminish the existence of a traffic anomaly (e.g., using labeled traffic data and vehicles action from known instances of traffic anomalies).

The operations computing system can input data indicative of at least the traffic data into the machine-learned model and receive, as an output, data indicative of a recommended vehicle action that can help diminish and/or eliminate a traffic anomaly. The vehicle action can include travelling with a certain gap distance behind other vehicles, maintaining a constant speed, maintaining a certain acceleration rate, changing lanes, avoiding brake usage, etc. These vehicle actions, taken in the aggregate among several autonomous vehicles, can diminish and/or eliminate the traffic anomaly, as further described herein. The machine-learned model can also output recommended vehicle action parameters (e.g., speed range, gap distance range) associated with the recommended vehicle actions. In some implementations, the recommended vehicle actions can be specific to a geographic area. For example, a particular type of traffic anomaly (e.g., traffic snake within a round-about) may be unique to particular a geographic area (e.g., a larger city). Thus, the recommended vehicle action can be specific that geographic area.

The operations computing system can generate a profile associated with the traffic reduction operation mode of the autonomous vehicle based at least in part on the machine-learned model. For instance, the profile can include one or more vehicle actions and one or more vehicle action parameters that are intended to cause the vehicle to operate in a manner to help address a traffic anomaly. The vehicle actions can include, for example, managing vehicle speed (e.g., constant, accelerating, decelerating), adjusting following distances behind objects, adjusting leading distances ahead of objects, lane changes, emergency behaviors, longitude/lateral control (e.g., within rider comfort profiles, behavior outside comfort profiles), performing unprotected turns, managing the vehicle's approach of other objects (e.g., objects in motion, objects not in motion), moving past objects (e.g., nudging past slower moving objects), and/or other vehicle actions. The vehicle action parameters can indicate the operating parameters for the vehicle when performing such vehicle actions. For example, the vehicle actions parameters can include a speed range, an acceleration rate, a deceleration rate, timing to establish a position in traffic (e.g., dwell times), distance between other objects (e.g., ideal spacing to maintain between other vehicles, road indications, other moving or non-moving objects, etc.), gap/buffer distance for performing a vehicle action (e.g., distance as a pre-condition of a vehicle action), a frequency of the vehicle action, a timing of the vehicle action (e.g., start time, duration, profile of longitudinal/lateral command, etc.), location of a vehicle action, adjustment of prediction attributes for objects proximate to the vehicle, and/or other parameters. The operations computing system can determine which vehicle actions and vehicle actions parameters to include in a profile based at least in part on the recommended vehicle actions (and parameters) outputted by the machine-learned model. For example, the operations computing system can include the vehicle actions and the vehicle action parameters that are estimated to effectively address the traffic anomalies that may occur in the geographic area in which the vehicle most frequently operates.

The operations computing system can detect a traffic anomaly within a geographic area. For instance, the operations computing system can monitor the traffic within a geographic area (e.g., via the traffic data obtained via the autonomous vehicles, via a traffic monitoring service) and detect whether a traffic anomaly exists in the geographic area. In some implementations, an autonomous vehicle can provide data indicative of a potential traffic anomaly within the geographic area (e.g., the sensor data, state date, prediction data, etc. indicate grid-lock at an intersection). The operations computing system can detect whether the traffic anomaly exists based at least in part on the data indicative of the potential traffic anomaly within the geographic area.

The operations computing system can determine at least one autonomous vehicle to address the traffic anomaly. For instance, the operations computing system can identify a plurality of autonomous vehicles that are proximate to the geographic area. The operations computing system can select at least one of the plurality of autonomous vehicles to address the traffic anomaly based on a variety of factors. In some implementations, the operations computing system can select a vehicle based at least in part on the location of the vehicle. For instance, the operations computing system can determine that the vehicle(s) that are closest to a location of the traffic anomaly within the geographic area should be selected to address the traffic anomaly. The operations computing system can also, or alternatively, select the vehicle(s) that are within a threshold distance to the location of the traffic anomaly. In some implementations, the operations computing system can select a vehicle based at least in part on a vehicle route (e.g., a currently planned route that will cause the vehicle to be affected by the traffic anomaly). In some implementations, the operations computing system can select a vehicle based at least in part on a vehicle status. For example, the operations computing system can select a vehicle that is not currently engaged in a vehicle service (e.g., rideshare service) rather than a vehicle that is currently engaged in a vehicle service. In some implementations, the operations computing system can perform a trade-off analysis to select a vehicle to address the traffic anomaly. For instance, the operations computing system can compare a cost/benefit associated with the autonomous vehicle providing a vehicle service to a cost/benefit associated with the autonomous vehicle travelling to help address the traffic anomaly. In some implementations, autonomous vehicle can be configured to send a communication requesting to enter into the traffic reduction operation mode (e.g., based on the time of day at which traffic anomalies typically occur in the geographic area).

The operations computing system can cause the selected autonomous vehicle(s) to travel in a manner to address the traffic anomaly. For instance, the operations computing system can provide a communication to an autonomous vehicle instructing the autonomous vehicle to enter into the traffic reduction operation mode. The autonomous vehicle can receive the communication and access data indicative of the profile associated with a traffic reduction operation mode stored onboard the autonomous vehicle. The vehicle action parameter(s) included in the profile can be used by the motion planning system to determine a motion plan for the autonomous vehicle. The autonomous vehicle can implement the motion plan by providing instructions to the vehicle control systems.

The autonomous vehicles can perform the vehicle actions while in the traffic reduction operation mode to help address the traffic anomaly. For instance, the autonomous vehicles can be routed to one or more locations ahead of a traffic anomaly (e.g., a traffic jam) and/or within a traffic anomaly (e.g., within a line of a stop-and-go traffic snake). The autonomous vehicles can be positioned accordingly within an intersection to stop other vehicles from further gridlocking the intersection. In another example, the autonomous vehicles can be positioned ahead of a traffic jam to preemptively decrease the speed of traffic to prevent further back-up around the traffic jam (e.g., and/or to provide more time/distance to clear an incident). In some implementations, the autonomous vehicles can be evenly spaced along a travel way that is experiencing the traffic anomaly. For example, the autonomous vehicles can be generally positioned in an even manner (e.g., every 0.5 miles) to attenuate the stop-and-go nature of a traffic snake (e.g., by traveling at a constant speed, maintain an acceleration/deceleration range, avoiding unnecessary braking, etc.). In this way, the autonomous vehicle can control its motion (e.g., via the vehicle control systems) in accordance with the traffic reduction operation mode to help address the traffic anomaly. The autonomous vehicle can continue to operate in the traffic reduction operation mode until otherwise instructed by the operations computing system (e.g., after attenuation of the traffic anomaly).

The operations computing system can monitor the autonomous vehicle to determine an effectiveness of the autonomous vehicle(s) on the traffic anomaly. The operations computing system can produce metrics indicative of the vehicle's effectiveness on traffic anomalies. In some implementations, in the event that the vehicles' actions are less effective, the operations computing system can adjust the profile associated with the traffic reduction operation mode. The operations computing system can provide the revised profile to the autonomous vehicle (e.g., in real-time, at a later time, etc.). In some implementations, the metrics can be stored and used as training data for the machine-learned model.

The systems and methods described herein may provide a number of technical effects and benefits. For instance, the operations computing system can manage a fleet of autonomous vehicles to reduce the effect of traffic conditions on the autonomous vehicles. To do so, the operations computing system can utilize the data typically captured and/or generated by the autonomous vehicle (e.g., sensor data, state data, prediction data, GPS data, IMU data). Thus, the systems and methods allow traffic anomalies to be addressed without additional data acquisition and/or storage onboard the autonomous vehicles.

The systems and methods of the present disclosure also provide an improvement to vehicle computing technology, such as autonomous vehicle computing technology. For instance, the systems and methods enable the vehicle technology to address traffic anomalies proximate to the vehicle without significantly increasing the computational requirements of the autonomous vehicle. For example, the systems and methods enable one or more computing devices (e.g., remote from the autonomous vehicle) to detect an existence of a traffic anomaly within a geographic area. The computing device(s) can determine at least one autonomous vehicle to address the traffic anomaly within the geographic area. The computing device(s) can provide communications with at least one autonomous vehicle instructing the autonomous vehicle to enter into a traffic reduction operation mode to address the traffic anomaly. The traffic reduction operation mode is based at least in part on a profile associated with the traffic reduction operation mode. The profile associated with the traffic reduction operation mode is stored onboard the autonomous vehicle. The autonomous vehicle is configured to operate in the traffic reduction operation mode. In this way, the systems and methods can pre-configure the autonomous vehicle to address traffic anomalies. This can avoid latencies issues that can arise from real-time, remote control of an individual vehicle's movement, as well as reduce the bandwidth needed for such an approach.

With reference now to the FIGS., example embodiments of the present disclosure will be discussed in further detail. FIG. 1 depicts an example system 100 according to example embodiments of the present disclosure. The system 100 includes a vehicle computing system 101 associated with a vehicle 102 and an operations computing system 104 that is remote from the vehicle 102.

The vehicle 102 incorporating the vehicle computing system 101 can be a ground-based autonomous vehicle (e.g., car, truck, bus), an air-based autonomous vehicle (e.g., airplane, drone, helicopter, or other aircraft), or other types of vehicles (e.g., watercraft). The vehicle 102 can be an autonomous vehicle that can drive, navigate, operate, etc. with minimal and/or no interaction from a human driver. For example, the vehicle 102 can be configured to operate in a fully autonomous manner (e.g., self-driving manner) such that the vehicle 102 can drive, navigate, operate, etc. with no interaction from a human driver. The vehicle 102 can also operate semi-autonomously with some interaction from a human driver present in the vehicle 102.

The vehicle computing system 101 can include one or more computing device(s) for implementing the various components of the vehicle computing system 101. As shown in FIG. 1, the vehicle 102 can include one or more data acquisition systems 106, an autonomy computing system 108, and one or more vehicle control systems 110. One or more of these systems can be configured to communicate with one another via a communication channel. The communication channel can include one or more data buses (e.g., controller area network (CAN), FlexRay), on-board diagnostics connector (e.g., OBD-II), and/or a combination of wired and/or wireless communication links. The on-board systems can send and/or receive data, messages, signals, etc. amongst one another via the communication channel.

The data acquisitions system(s) 106 can be configured to obtain acquire sensor data 112 associated with one or more objects that are proximate to the vehicle 102 (e.g., within a field of view of one or more of the data acquisition system(s) 106). The data acquisitions system(s) 106 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 112 can include image data, radar data, LIDAR data, and/or other data acquired by the data acquisitions system(s) 106. The object(s) can include, for example, pedestrians, vehicles, bicycles, and/or other objects. The object(s) can be located within the travel way (e.g., road) of the vehicle 102, traveling in an adjacent travel way (e.g., on a sidewalk, a running path), etc. The sensor data 112 can be indicative of locations associated with the object(s) within the surrounding environment of the vehicle 102 at one or more times. The data acquisition system(s) 106 can provide the sensor data 112 to the autonomy computing system 108.

In addition to the sensor data 112, the autonomy computing system 108 can retrieve or otherwise obtain map data 114 associated with the surroundings of the vehicle 102. The map data 114 can provide detailed information about the surrounding environment of the vehicle 102. For example, the map data 114 can provide information regarding: the identity and general location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomy computing system 108 can include a perception system 116, a prediction system 118, and a motion planning system 120 that cooperate to perceive the surrounding environment of the vehicle 102 and determine a motion plan for controlling the motion of the vehicle 102 accordingly. For example, the autonomy computing system 108 can receive the sensor data 112 from the data acquisition system(s) 106, attempt to comprehend the surrounding environment by performing various processing techniques on data collected by the data acquisition system(s) 106, and generate an appropriate motion plan through such surrounding environment. The autonomy computing system 108 can control the one or more vehicle control systems 110 to operate the vehicle 102 according to the motion plan.

The autonomy computing system 108 can identify one or more objects that are proximate to the vehicle 102 based at least in part on the sensor data 112 and/or the map data 114. For example, the perception system 116 can obtain state data 122 descriptive of a current state of an object that is proximate to the vehicle 102. The state data 122 for each object can describe, for example, an estimate of the object's: current location (also referred to as position); current speed (also referred to as velocity); current acceleration, current heading; current orientation; size/footprint (e.g., as represented by a bounding polygon); class (e.g., pedestrian class vs. vehicle class vs. bicycle class), and/or other state information. The perception system 116 can provide the state data 122 to the prediction system 118 (e.g., for predicting the movement of an object).

The prediction system 118 can create predicted data 124 associated with each of the respective one or more objects proximate to the vehicle 102. The predicted data 124 can be indicative of one or more predicted future locations of each respective object. The predicted data 124 can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the speed at which the object is predicted to travel along the predicted path). The prediction system 118 can provide the predicted data 124 associated with the object(s) to the motion planning system 120.

The motion planning system 120 can determine a motion plan 126 for the vehicle 102 based at least in part on the predicted data 124. The motion plan 126 can include vehicle actions with respect to the objects proximate to the vehicle 102 as well as the predicted movements. For instance, the motion planning system 120 can implement an optimization algorithm that considers cost data associated with a vehicle action as well as other cost functions (e.g., based on speed limits, traffic lights, etc.), if any, to determine optimized variables that make up the motion plan 126. By way of example, the motion planning system 120 can also determine that the vehicle 102 can perform a certain action (e.g., pass an object) without increasing the potential risk to the vehicle 102 and/or violating any traffic laws (e.g., speed limits, lane boundaries, signage). The motion plan 126 can include a planned trajectory, speed, acceleration, etc. of the vehicle 102. A trajectory can be short in duration and continuously recalculated by the vehicle 102.

The motion planning system 120 can provide the motion plan 126 indicative of the vehicle actions, a planned trajectory, and/or other parameters to the vehicle control system(s) 110 to implement the motion plan 126 for the vehicle 102. For instance, the vehicle 102 can include a mobility controller configured to translate the motion plan 126 into instructions. By way of example, the mobility controller can translate a determined motion plan 126 into instructions to adjust the steering of the vehicle 102 "X" degrees, apply a certain magnitude of braking force, etc. The mobility controller can send one or more control signals to the vehicle control components (e.g., braking control component, steering control component) to execute the instructions and implement the motion plan.

The vehicle 102 can include one or more positioning systems 128. The positioning system(s) 128 can determine a current position of the vehicle 102. The positioning system(s) 128 can be any device or circuitry for analyzing the position of the vehicle 102. For example, the positioning system(s) 128 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 101 and/or provided to a remote computing device (e.g., of the operations computing system 104). For example, the map data can 114 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 112 (e.g., LIDAR data, camera data) to match it to a map of the surrounding environment.

The vehicle 102 can include one or more inertial measurement units 130 that are configured to detect velocity, acceleration/deceleration, orientation, gravitational information, magnetic field, etc. associated with the vehicle 102. The inertial measurement unit(s) 130 can include, for example, an accelerometer, gyroscope, and/or other measurement devices. The inertial measurement units 130 can capture data associated with the vehicle 102 in real-time (or near real-time) as the vehicle 102 is traveling. The data acquired via inertial measurement unit(s) 130 can be used by various systems of the vehicle computing system 101 and/or provided to a remote computing device (e.g., of the operations computing system 104).

The vehicle 102 can be configured to operate in one or more operational modes 132A-C. Each operation mode can include certain vehicle action parameters that affect how the vehicle 102 travels while in that particular mode. For example, the vehicle 102 can operate in an armored vehicle mode 132A in which the vehicle 102 minimizes the number of stops during travel. Additionally, or alternatively, the vehicle 102 can operate in a fragile transport mode 132B, during which the vehicle 102 minimizes the number of higher speed turns, speed bumps, etc. The vehicle 102 can operate in a traffic reduction operation mode 132C to help address a traffic anomaly, as further described herein.

The vehicle 102 can be associated with an entity (e.g., a service provider) that provides one or more vehicle service(s) to a plurality of users via a fleet of vehicles that includes, for example, the vehicle 102. The vehicle service(s) can include transportation services (e.g., rideshare services), courier services, delivery services, and/or other types of services. The operations computing system 104 can be associated with the entity associated with the vehicle 102. The entity (e.g., a service provider) can utilize the operations computing system 104 (e.g., that is remote from the vehicles) to manage the fleet of vehicles, such as to select the appropriate operation mode 132A-C for the vehicle 102. The selection of an operational mode 132A-C can be based at least in part on the objective of the entity that manages the vehicle fleet. For example, the operations computing system 104 can select the traffic reduction operation mode 132C for a vehicle 102 to address particular traffic anomalies.

The operations computing system 104 can include one or more computing devices 134 that are remote from the vehicle 102. The computing device(s) 134 can include one or more processors and one or more tangible, non-transitory, computer readable media that collectively store instructions that when executed by the one or more processors cause the operations computing system 104 (e.g., its one or more processors) to perform operations such as, for example, the operations for managing autonomous vehicles to address traffic anomalies.

The computing device(s) 134 can obtain traffic data 136 associated with the vehicle 102. In some implementations, the vehicle 102 (and/or the other plurality of vehicles within an associated fleet) can provide traffic data 136 associated with the vehicle 102 to the operations computing system 104 (e.g., periodically, as scheduled, in real-time, near real-time) as the vehicle 102 travels within a geographic area. As described herein, the vehicle 102 can obtain various types of data associated with the vehicle itself and/or the vehicle's surrounding environment as the vehicle 102 travels within a geographic area. Such data can be indicative of the traffic around the vehicle 102 because the data can be descriptive of the movement of the vehicle 102 within traffic as well as the movement of other objects (e.g., vehicles) within traffic that are proximate to the vehicle 102.

In some implementations, the traffic data 136 can be associated with the motion of the vehicle 102. For instance, the traffic data 136 can be indicative of the acceleration rate, speed, stopped time, location, and/or other conditions of the vehicle 102 based at least in part on data acquired via the positioning system(s) 128 and/or the inertial measurement unit(s) 130. By way of example, the traffic data 136 can be indicative of the acceleration and/or deceleration rate of the vehicle 102 (e.g., registered by the inertial measurement unit(s) 130) as the vehicle 102 travels according to a traffic snake (e.g., in a stop and go manner).

Additionally, or alternatively, the traffic data 136 can include data associated with the surrounding environment of the vehicle 102. For instance, the traffic data 136 can be indicative of the movement of one or more other objects (e.g., vehicles) proximate to the vehicle 102. As described herein, the movement of the vehicle(s) proximate to the vehicle 102 can be determined based at least in part on the sensor data 112, the state data 122, and/or the predicted data 124 associated with the object(s) proximate to the vehicle 102 (e.g., the other vehicles travelling within the traffic snake). In some implementations, the vehicle 102 can provide, to the operations computing system 104, the traffic data 136, which can be indicative of at least one of the sensor data 112, the state data 122, and/or the predicted data 124. The computing device(s) 134 can be configured to process such data to determine the movement of the vehicle(s) proximate to the vehicle 102 within traffic. In some implementations, the vehicle computing system 101 can generate the traffic data 136 (e.g., indicative of the movement of one or more vehicles proximate to the vehicle 102) based at least in part on at least one of the sensor data 112, the state data 122, or the predicted data 124.

Additionally, or alternatively, the computing device(s) 134 can obtain the traffic data 136 from other another source. For example, the computing device(s) 134 can receive the traffic data 136 from a computing device associated with a traffic monitoring service, mapping service, etc. In some implementations, the computing device(s) 134 can remotely monitor the movements of the vehicle 102 (and/or other vehicles proximate thereto) and determined the traffic data 136 based at least in part on the monitored movement of the vehicle 102 (and/or other vehicles proximate thereto).

The computing device(s) 134 can generate a profile 138 associated with the traffic reduction operation mode 132C of the vehicle 102. The profile 138 can help the vehicle 102 to operate in a manner that effectively addresses a traffic anomaly. To generate a profile 138, the computing device(s) 134 can include, employ, and/or otherwise leverage a model 140. In particular, the model 140 can be a machine-learned model. For example, the machine-learned model can be or can otherwise include one or more various model(s) such as, for example, models utilizing boosted random forest techniques, support vector machines, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model 140 to develop recommended vehicle actions that help diminish the existence of a traffic anomaly (e.g., using labeled traffic data and vehicles actions from known instances of traffic anomalies), as further described herein.

Figure 2:
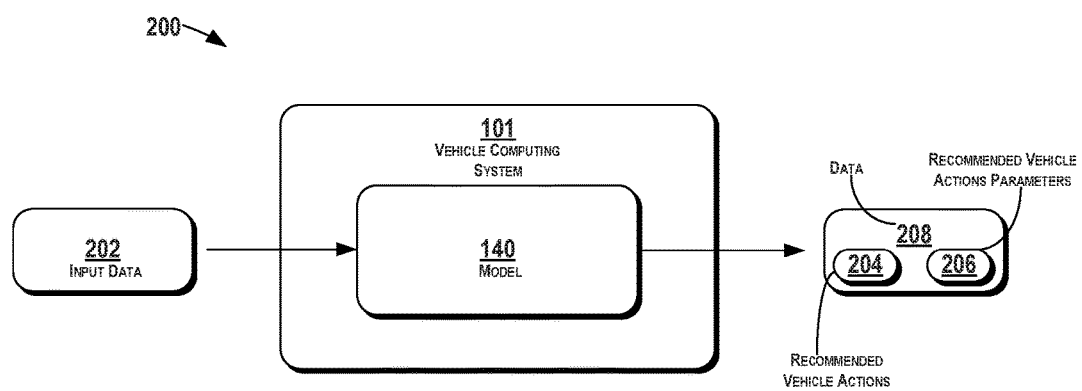
FIG. 2 depicts a diagram of an example implementation of a machine-learned model according to example embodiments of the present disclosure.

FIG. 2 depicts an example implementation 200 of a machine-learned model according to example embodiments of the present disclosure. As shown, the computing device(s) 134 can obtain data descriptive of the model 140 (e.g., machine learned model). The computing device(s) 134 can provide input data 202 to the model 140. The input data 202 can include the traffic data 136 (e.g., associated with one or more of a plurality of vehicles). In some implementations, the input data 202 can include the map data 114. The model 140 can determine one or more recommended vehicle actions 204 that can help diminish and/or eliminate a traffic anomaly. By way of example, the model 140 can evaluate the traffic data to determine the existence of a traffic anomaly (e.g., gridlocked intersection). The model 140 can determine how a vehicle 102 should travel before and/or as it approaches the intersection to help eliminate the gridlock. In another example, the model 140 can determine how a vehicle 102 should travel to help attenuate a stop and go traffic snake. The recommended vehicle action(s) 204 can include travelling with a certain gap distance behind other vehicles, maintaining a constant speed, maintaining a certain acceleration rate, changing lanes, avoiding brake usage, etc. These recommended vehicle action(s) 204, taken in the aggregate among several vehicles, can diminish and/or eliminate a traffic anomaly, as further described herein. The model 140 can also determine recommended vehicle action parameters 206 (e.g., speed range, gap distance range) associated with the recommended vehicle actions 204. The recommended vehicle operating parameter(s) 206 can be indicative of the values, ranges, thresholds, times, locations, etc. associated with a recommended vehicle action 204, as further described herein. In some implementations, the recommended vehicle actions 204 can be specific to a geographic area. For example, a particular type of traffic anomaly (e.g., traffic snake within a round-about) may be unique to particular a geographic area (e.g., a larger city). Thus, the recommended vehicle action for can be specific for that geographic area (and/or an area similar thereto). The computing device(s) 134 can receive, as an output of the model 140, data 208 indicative of the one or more vehicle actions 204 (e.g., associated with a geographic area). The data 208 can also be indicative of the one or more vehicle action parameters 206.

In some implementations, the output of the model 140 can be provided as an input to the model 140 for another set of traffic data (e.g., at a subsequent time step). In such fashion, confidence can be built that a determined vehicle action is the most appropriate action for a traffic anomaly. Stated differently, in some implementations, the process can be iterative such that the vehicle actions can be recalculated over time as it becomes clearer which vehicle action should be taken for a particular traffic anomaly. For example, the model 140 can include one or more autoregressive models. In some implementations, the model 140 can include one or more machine-learned recurrent neural networks. For example, recurrent neural networks can include long or short-term memory recurrent neural networks, gated recurrent unit networks, or other forms of recurrent neural networks.

Returning to FIG. 1, the profile 138 can be based at least in part on the model 140 (e.g., the output of the machine-learned model). For instance, the computing device(s) 134 can generate the profile 138 associated with the traffic reduction operation mode 132C of the vehicle 102 based at least in part on the model 140. For instance, the profile 138 can include one or more vehicle actions 142 and one or more vehicle action parameters 144 that are intended to cause the vehicle 102 to operate in a manner to help address a traffic anomaly. The computing device(s) 134 can determine which vehicle actions 142 and vehicle action parameters 144 to include in the profile 138 based at least in part on the recommended vehicle actions 204 and/or recommended vehicle action parameters 206 outputted by the model 140. For example, the computing device(s) 134 can include the recommended vehicle actions 204 and the recommended vehicle action parameters 206 that are estimated to effectively address the traffic anomalies that may occur in the geographic area in which the vehicle 102 most frequently operates.

The vehicle action(s) 142 can include various types of actions associated with the vehicle 102. For example, the vehicle action(s) 142 can include, for example, managing vehicle speed (e.g., constant, accelerating, decelerating), adjusting following distances behind objects, adjusting leading distances ahead of objects, lane changes, emergency behaviors, longitude/lateral control (e.g., within rider comfort profiles, behavior outside comfort profiles), performing unprotected turns, managing the vehicle's approach of other objects (e.g., objects in motion, objects not in motion), moving past objects (e.g., nudging past slower moving objects), and/or other vehicle actions. The vehicle action parameter(s) 144 can indicate the operating parameters for the vehicle 102 when performing one or more of the vehicle action(s) 142. For example, the vehicle action parameter(s) 144 can include a speed range, an acceleration rate, a deceleration rate, timing to establish a position in traffic (e.g., dwell times), distance between other objects (e.g., ideal spacing to maintain between other vehicles, road indications, other moving or non-moving objects, etc.), gap/buffer distance for performing a vehicle action (e.g., distance as a pre-condition of a vehicle action), a frequency of the vehicle action, a timing of the vehicle action (e.g., start time, duration, profile of longitudinal/lateral command, etc.), location of a vehicle action, adjustment of prediction attributes for objects proximate to the vehicle, and/or other parameters. The computing device(s) 134 can provide, for storage onboard the vehicle 102, data indicative of the profile 138 associated with the traffic reduction operation mode 132C to at least one vehicle 102.

Figure 3:
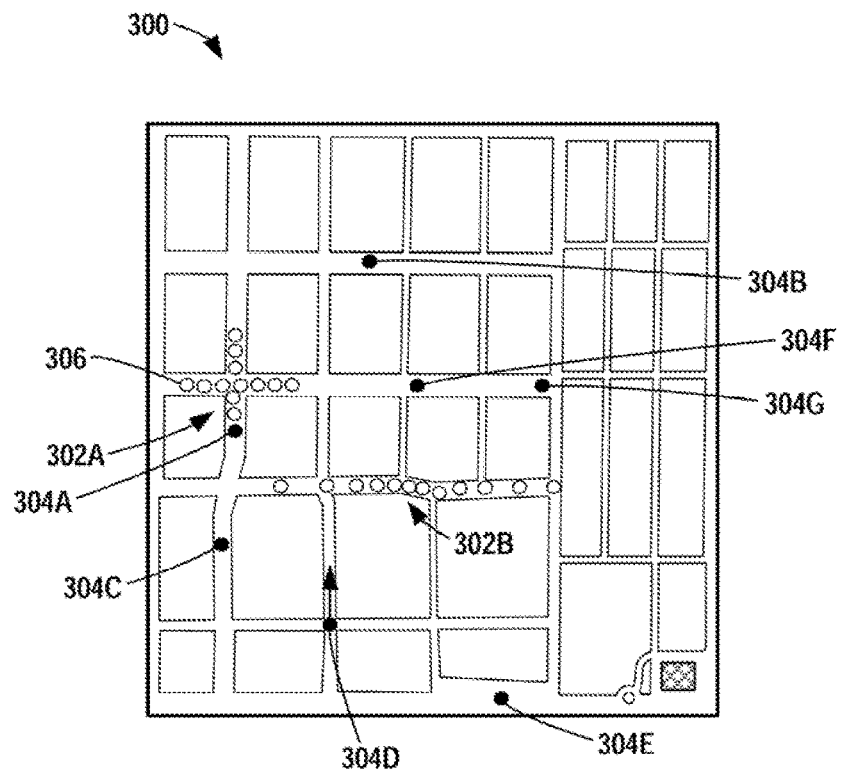
FIG. 3 depicts an example geographic area according to example embodiments of the present disclosure.

The computing device(s) 134 can detect an existence of a traffic anomaly within a geographic area. FIG. 3 depicts an example geographic area 300 according to example embodiments of the present disclosure (e.g., at a first time). One or more traffic anomalies 302A-B can exist within the geographic area 300. One or more vehicles 304A-G (e.g., similar to vehicle 102 of FIG. 1) can be proximate to the geographic area 300 (e.g., travelling near and/or located within the geographic area 300).

The computing device(s) 134 can detect the existence of a first traffic anomaly 302A (e.g., a gridlocked intersection) within the geographic area 300. Additionally, or alternatively, the computing device(s) 134 can detect the existence of a second traffic anomaly 302B (e.g., a stop-and-go traffic snake) within the geographic area 300. In some implementations, the computing device(s) 134 can determine the existence of a traffic anomaly 302A-B based at least in part on the traffic data 136 (e.g., obtained via one or more vehicles, via a traffic monitoring service). For example, the computing device(s) 134 can determine that the vehicle 102 has been stuck at an intersection based at least in part on the data from the positioning system 128 and/or the inertial measurement unit 130. Moreover, the computing device(s) 134 can determine that one or more other vehicles 306 are also stuck at the intersection based at least in part on the sensor data 112, state data, and/or the prediction data 124. As such, the computing device(s) 134 can determine the existence of a traffic anomaly 302A (e.g., a gridlocked intersection). In some implementations, the computing device(s) 134 can monitor the movements of one or more vehicles 304A-G within the geographic area 300 in real-time and/or near real-time based on the data only from the positioning system(s) 128 and/or the inertial measurement unit(s) 130. The computing device(s) 134 can determine that a traffic anomaly 302A-B exists in the geographic area 300 based at least in part on the data from the positioning system(s) 128 and/or the inertial measurement unit(s) 130. In some implementations, the computing device(s) 134 can determine the existence of a traffic anomaly 302A-B based at least in part on one or more machine-learned techniques described herein.

In some implementations, a vehicle computing system 101 of a vehicle traveling within the geographic area 300 can determine that a potential traffic anomaly 302A (e.g., gridlock at an intersection) exists. For example, the vehicle computing system of the vehicle 304A can determine that the vehicle 102 has been stuck at an intersection based at least in part on the data from the positioning system 128 and/or the inertial measurement unit 130 and/or that other vehicles 306 are stuck at the intersection based at least in part on the sensor data 112, state data 122, and/or the prediction data 124. The vehicle computing system of the vehicle 304A can provide data indicative of a potential traffic anomaly 302A to the computing device(s) 134 of the operations computing system 104. The computing device(s) 134 can receive the data indicative of a potential traffic anomaly 302A from the at least one vehicle 304A. The computing device(s) 134 can determine the existence of the traffic anomaly 302A within the geographic area 300 based at least in part on the data indicative of the potential traffic anomaly 302A.

The computing device(s) 134 can determine at least one vehicle 304A-G to address the traffic anomaly 302A-B. For instance, the computing device(s) 134 can identify a plurality of vehicles 304A-G (e.g., within a vehicle fleet) that are proximate to the geographic area 300. For example, one or more (or each) of the plurality of autonomous vehicles 304A-G can be within a threshold distance (e.g., with 1, 5, 10, 20, etc. miles) from a location of a traffic anomaly 302A-B. The computing device(s) 134 can select at least one of the plurality of autonomous vehicles 304A-D to address the traffic anomaly 302A-B based on a variety of factors. In some implementations, the operations computing system can select a vehicle based at least in part on the location of the vehicle. For instance, the computing device(s) 134 can determine that the vehicle(s) 304A-C are closest to a location of the traffic anomaly 302A within the geographic area 300. As such, the computing device(s) 134 can determine that at least one of the vehicle(s) 304A-C is to address the traffic anomaly 302A.

In some implementations, the computing device(s) 134 can select a vehicle based at least in part on a vehicle route (e.g., a currently planned route that will cause the vehicle to be affected by the traffic anomaly). For instance, the computing device(s) 134 can determine that the vehicle 304D is to travel towards and/or within the traffic anomaly 302B (e.g., based at least in part on motion plan 126). The computing device(s) 134 can determine that the vehicle 304D is to address the traffic anomaly 302B (e.g., the traffic snake).

In some implementations, the computing device(s) 134 can select a vehicle based at least in part on a vehicle status.

For example, the computing device(s) 134 can determine at least one vehicle 304A-G is currently providing a vehicle service (e.g., a rideshare service). The computing device(s) 134 can select a vehicle that is not currently engaged in a vehicle service to address a traffic anomaly 302A-B rather than a vehicle that is currently engaged in a vehicle service (e.g., so as not to disrupt a user of the vehicle service). In some implementations, the computing device(s) 134 can perform a trade-off analysis to determine the at least one vehicle to address the traffic anomaly 302A-B. For instance, the computing device(s) 134 can compare a cost/benefit associated with the vehicle providing a vehicle service (e.g., the potential revenue gained) to a cost/benefit associated with the vehicle travelling to help address the traffic anomaly. The cost/benefit associated with the vehicle travelling to help address the traffic anomaly can include the potential forgone revenue, opportunity cost, travel operating costs (e.g., fuel, data costs), potential benefit to other vehicles providing a vehicle service (e.g., increase revenue from more efficient service due to elimination of a traffic anomaly), potential operating cost savings (e.g., from elimination of the traffic anomaly), etc. The computing device(s) 134 can determine that a vehicle is to address the traffic anomaly in the event that the cost/benefit associated with the vehicle providing a vehicle service is outweighed by a cost/benefit associated with the vehicle travelling to help address the traffic anomaly.

In some implementations, the computing device(s) 134 can select a vehicle to address a traffic anomaly based at least in part on a vehicle request. For instance, a vehicle can provide a communication 146 (as shown in FIG. 1) requesting permission to enter into the traffic operation reduction mode 132C. The vehicle can send the communication 146 based at least in part on the time of day at which traffic anomalies typically occur in the geographic area, the detection of a potential traffic anomaly, etc. In some implementations, the communication 146 requesting a change to the traffic operation reduction mode 132C can be provided with (and/or as a part of) data indicative of the potential traffic anomaly.

Returning to FIG. 1, the computing device(s) 134 can cause the selected vehicle(s) to travel in a manner to address the traffic anomaly 302A-B. For instance, the computing device(s) 134 can provide a communication 148 to at least one vehicle 102 instructing the vehicle 102 to enter into a traffic reduction operation mode 132C. As described herein, the traffic reduction operation mode 132C can be based at least in part on a profile 138 stored onboard the vehicle 102 (e.g., within the motion planning system 120). The vehicle 102 can receive the communication 148 instructing the vehicle 102 to enter into the traffic reduction operation mode 132C. The vehicle 102 can access data indicative of the profile 138 associated with the traffic reduction operation mode 132C stored onboard the vehicle 102. The vehicle 102 can determine a motion plan 126 for the vehicle 102 based at least in part on the profile 138 associated with the traffic reduction operation mode 132C. For example, the vehicle 102 (e.g., the motion planning system 120) can determine a motion plan 126 for the vehicle 102 based at least in part on the vehicle action(s) 142 and/or the vehicle action parameter(s) 144 included in the profile 138. The vehicle 102 can control (e.g., via the control system(s) 110) the motion of the vehicle 102 based at least in part on the motion plan 126 for the vehicle 102.

Figure 4:
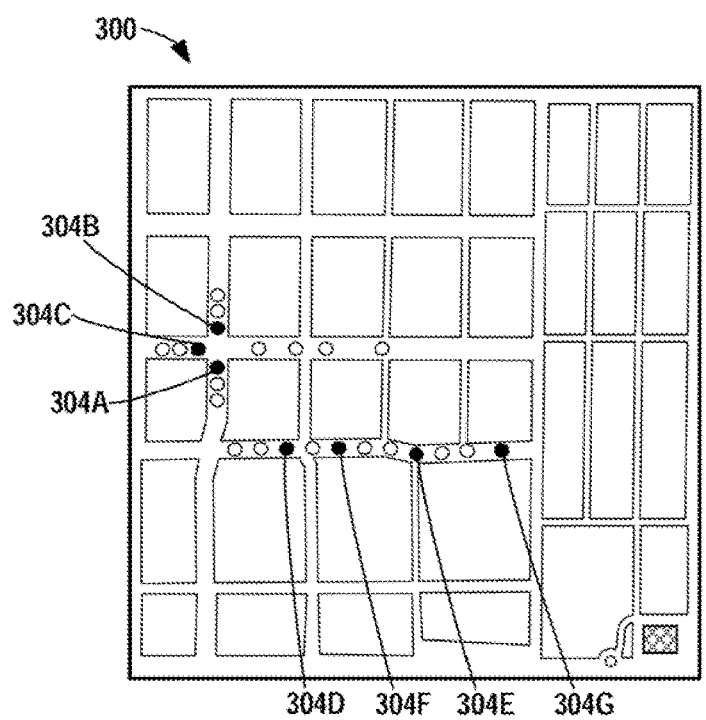
FIG. 4 depicts a diagram of an example geographic area according to example embodiments of the present disclosure.

The vehicle 102 can implement the motion plan 126 and operate according to the traffic reduction operation mode 132 to help address a traffic anomaly 302A-B. For instance, FIG. 4 depicts the geographic area 300 (e.g., at a second time) with the vehicles 304A-G performing vehicle actions (e.g., via implemented motion plans) to address the traffic anomalies 302A-B. The vehicles 304A-G can travel to one or more locations ahead of and/or within a traffic anomaly. By way of example, the vehicles 304A-C can regulate speed and become positioned with respect to an intersection to address the traffic anomaly 302A (e.g., to stop other vehicles from further gridlocking the intersection). Over time, the vehicles 304A-C can influence the movement of the other vehicles associated with the traffic anomaly 302A to diminish and eventually eliminate the traffic anomaly 302A. In another example, the vehicles 304D-G can be position in line with respect to the traffic anomaly. For instance, the vehicles 304D-G can be approximately evenly spaced (e.g., every 0.5 miles) with respect to the traffic anomaly 302B (e.g., stop-and-go traffic snake). Moreover, the vehicles 304D-G can perform one or more vehicle actions 142 according to the vehicle action parameter(s) 144 to attenuate the traffic anomaly 302B. The vehicles 304D-G can travel within a speed range, maintain an acceleration/deceleration range, avoid unnecessary braking, etc. In this way, a vehicle 304D-G can control its motion (e.g., via the vehicle control systems) in accordance with the traffic reduction operation mode 132D to help address the traffic anomaly 302B. In some implementations, one or more vehicles can be positioned at a head of a traffic jam to preemptively decrease the speed of traffic to address a traffic anomaly (e.g., to prevent further back-up around a traffic jam and/or to provide more time/distance to clear an incident). The vehicles 304A-G can continue to operate in the traffic reduction operation mode 132C until otherwise instructed by the computing device(s) 134 of the operations computing system 104 (e.g., after attenuation of the traffic anomaly 302A-B)

Returning to FIG. 1, the computing device(s) 134 can monitor one or more vehicles to determine an effectiveness 150 of the vehicle(s) on the traffic anomaly 302A-B. The effectiveness 150 can include one or more metrics indicative of the vehicle's effect on the traffic anomalies 302A-B. The metric(s) can include amount of attenuation, time to elimination, number of vehicles deployed to the traffic anomaly, etc. In some implementations, the computing device(s) 134 can adjust the profile 138 associated with the traffic reduction operation mode 132C based at least in part on the effectiveness 150 of at least one vehicle on the traffic anomaly 302A-B. For instance, in the event that the vehicles' actions are less effective on the traffic anomaly, the computing device(s) 134 can adjust the vehicle actions 142 and/or the vehicle action parameter(s) 144 included in the profile 138 associated with the traffic reduction operation mode 132C. The computing device(s) 134 can provide the revised profile to the vehicle (e.g., in real-time, at a later time, etc.). In some implementations, the computing device(s) 134 can adjust the model 140 based at least in part on the effectiveness 150. For example, the metrics can be stored and used as training data for the model 140 (e.g., the machine-learned model).

In some implementations, the computing device(s) 134 can acquire data associated with user ratings. For instance, the vehicle 102 can include one or more passengers when the vehicle 102 is operating in the traffic reduction operation mode 132C. The passengers can provide (e.g., via a human machine interface of the vehicle 102, a user device of the passenger) user rating data associated with the vehicle 102. Passengers can be users of a vehicle service (e.g., rideshare service), associated with the entity (e.g., service provider workers), and/or a human driver (e.g., for when the vehicle 102 is in the semi-autonomous mode). The user rating data can be indicative of the passenger's level of comfort, satisfaction, happiness, etc. with the vehicle 102 as the vehicle 102 operates in the traffic reduction operation mode 132C. In some implementations, the user rating data can be indicative of the effectiveness of the vehicle 102 on a traffic anomaly, as perceived by the passenger. The computing device(s) 134 can utilize the user rating data when performing the trade-off analysis as described herein, when determining the effectiveness 150, and/or for other purposes.

Figure 5:
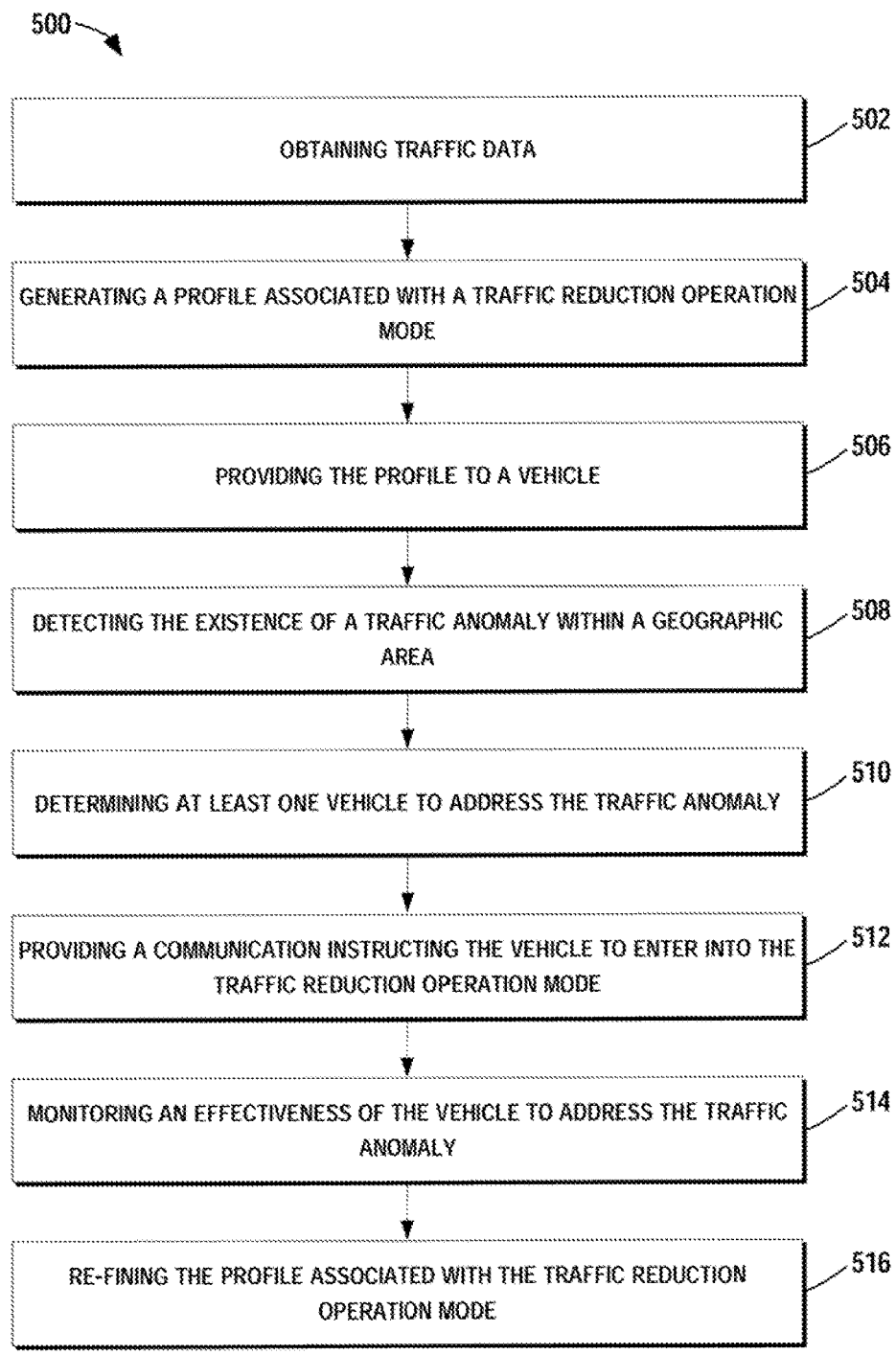
FIG. 5 depicts a flow diagram of an example method of managing autonomous vehicles to address traffic anomalies according to example embodiments of the present disclosure.

FIG. 5 depicts a flow diagram of an example method 500 of managing autonomous vehicles to address traffic anomalies according to example embodiments of the present disclosure. One or more portion(s) of the method 500 can be implemented by one or more computing devices such as, for example, the computing device(s) 134 of FIG. 1. Moreover, one or more portion(s) of the method 500 can be implemented as an algorithm on the hardware components of the device(s) described herein (e.g., as in FIGS. 1 and 7) to, for example, control the motion of a vehicle. FIG. 5 presents elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining traffic data. For instance, the computing device(s) 134 of the operations computing system 104 (e.g., that are remote from the vehicle 102) can obtain traffic data 136 associated with one or more of a plurality of vehicles. As described herein, the traffic data 136 can be associated with at least one of a positioning system 128 or an inertial measurement unit 130 of the vehicle 102. For instance, the traffic data can be based at least in part on data captured via at least one of a positioning system 128 or an inertial measurement unit 130 of the vehicle 102 (e.g., the position, acceleration rate). Additionally, or alternatively, the traffic data 136 can be indicative of the motion associated with one or more other vehicles, as described herein.

At (504), the method 500 can include generating a profile associated with a traffic reduction operation mode. For instance, the computing device(s) 134 can generate the profile 138 associated with the traffic reduction operation mode 132C. The computing device(s) 134 can obtain data indicative of a model 140 (e.g., machine-learned model). The computing device(s) 134 can input the traffic data 136 into the model 140. The computing device(s) 134 can receive data indicative of one or more vehicle actions (e.g., recommended vehicle actions 204) as an output 208 of the model 140. The output 208 of the model 140 can also include one or more vehicle action parameters (e.g., recommended vehicle operating parameter(s) 206) associated with the one or more vehicle actions. The profile 138 can include the one or more vehicle actions 142 and the one or more vehicle action parameters 144 associated with the one or more vehicle actions, as described herein. The computing device(s) 134 can provide data indicative of the profile 138 associated with the traffic reduction operation mode 132C to at least one vehicle 102, at (506).

At (508), the method 500 can include detecting the existence of a traffic anomaly within a geographic area. For instance, the computing device(s) 134 can detect an existence of a traffic anomaly 302A-B within a geographic area 300. In some implementations, as described herein, the computing device(s) 134 can receive traffic data 136 from at least one vehicle (and/or another source) and determine the existence of the traffic anomaly 302A-B within the geographic area 300 based at least in part on the traffic data 136. In some implementations, the computing device(s) 134 can receive data indicative of a potential traffic anomaly from at least one vehicle. The computing device(s) 134 can determine the existence of the traffic anomaly 302A-B within the geographic area 300 based at least in part on the data indicative of the potential traffic anomaly.

At (510), the method 500 can include determining at least one vehicle to address the traffic anomaly. For instance, the computing device(s) 134 can determine at least one vehicle 304A-G to address the traffic anomaly 302A-B within the geographic area 300. By way of example, the computing device(s) 134 can identify a plurality of vehicles 304A-G that are proximate to the geographic area 300 experiencing the traffic anomaly 302A-B (e.g., gridlock, traffic snake). The computing device(s) 134 can select one or more vehicles 304A-G of the plurality of vehicles to address the traffic anomaly 302A-B, as described herein.

At (512), the method 500 can include providing a communication instructing the vehicle to enter into the traffic reduction operation mode. For instance, the computing device(s) 134 can provide a communication 148 to the at least one vehicle 102 instructing the vehicle 102 to enter into a traffic reduction operation mode 132C to address the traffic anomaly 302A-B. The traffic reduction operation mode 132C can be based at least in part on a profile 138 associated with the traffic reduction operation mode 132C, as described herein. The profile 138 associated with the traffic reduction operation mode 132C can be stored onboard the vehicle, which can be configured to operate in the traffic reduction operation mode 132C.

At (514), the method 500 can include monitoring an effectiveness of the vehicle to address the traffic anomaly. For instance, the computing device(s) 134 can determine an effectiveness 150 of the at least one vehicle on the traffic anomaly 302A-B. The computing device(s) 134 can adjust the profile 138 associated with the traffic reduction operation mode 132C based at least in part on the effectiveness 150 of the at least one vehicle on the traffic anomaly 302A-B, at (516), as described herein.

Figure 6:
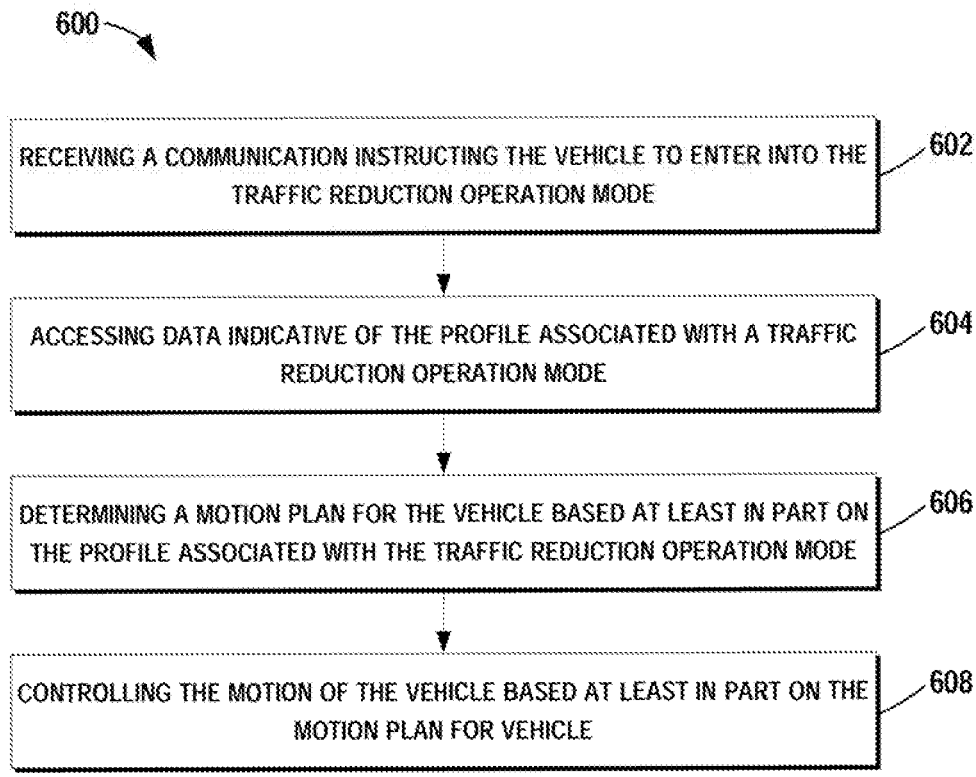
FIG. 6 depicts a flow diagram of an example method of controlling an autonomous vehicle to address a traffic anomaly according to example embodiments of the present disclosure.

FIG. 6 depicts a flow diagram of an example method 600 of controlling an autonomous vehicle to address a traffic anomaly according to example embodiments of the present disclosure. One or more portion(s) of the method 600 can be implemented by one or more computing devices such as, for example, one or more computing devices of the vehicle 102. Moreover, one or more portion(s) of the method 600 can be implemented as an algorithm on the hardware components of the device(s) described herein (e.g., as in FIGS. 1 and 7) to, for example, control the motion of a vehicle. FIG. 6 presents elements performed in a particular order for purposes of illustration and discussion only and are not intended to be limiting, as described herein.

At (602), the method 600 can include receiving a communication instructing the vehicle to enter into the traffic reduction operation mode. For instance, the vehicle 102 can receive a communication 148 (e.g., from a remote computing device 134 that is remote from the vehicle 102) instructing the vehicle 102 to enter into the traffic reduction operation mode 132C. The vehicle 102 can be travelling within a geographic area 300 that includes a traffic anomaly 302A-B. In some implementations, the vehicle 102 can provide (e.g., to a remote computing device 134 that is remote from the vehicle 102), a communication requesting permission to enter into the traffic reduction operation mode 132. In some implementations, the vehicle 102 can receive the communication 148 in response to such a request.

At (604), the method 600 can include accessing data indicative of the profile associated with the traffic reduction operation mode. For instance, the vehicle 102 can include a profile 138 associated with the traffic reduction operation mode 132C stored onboard the vehicle 102. The profile 138 can include one or more vehicle actions 142 and one or more vehicle action parameters 144 associated with the one or more vehicle actions 142. The vehicle 102 can access data indicative of the profile 138 associated with the traffic reduction operation mode 132 stored onboard the vehicle 102.

At (606), the method 600 can include determining a motion plan for the autonomous vehicle based at least in part on the profile associated with the traffic reduction operation mode. For instance, the vehicle 102 can determine a motion plan 126 for the vehicle 102 based at least in part on the profile 138 associated with the traffic reduction operation mode 132C. The motion plan 126 can include one or more vehicle actions 142 of the profile 138 as well as the vehicle action parameter(s) 144 for operating the vehicle 102 to perform the vehicle action(s) 142. The vehicle 102 can control (e.g., via the vehicle control system(s) 110) a motion of the vehicle 102 based at least in the motion plan 126 for the vehicle 102 to help address the traffic anomaly, at (608).

Figure 7:
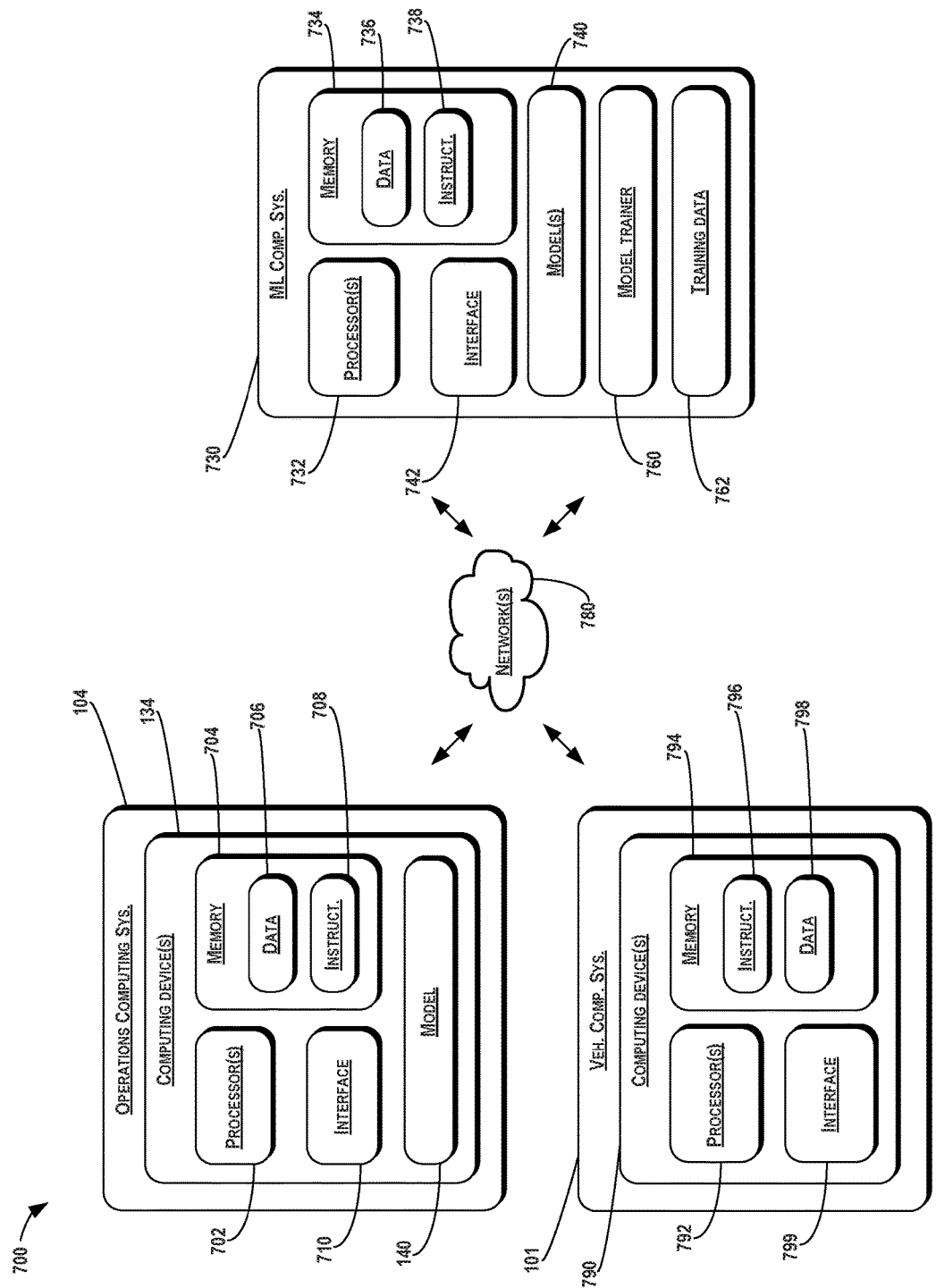
FIG. 7 depicts example system components according to example embodiments of the present disclosure.

FIG. 7 depicts a block diagram of an example computing system 700 according to example embodiments of the present disclosure. The example system 700 includes the operations computing system 104 and a machine learning computing system 730 that are communicatively coupled over a network 780.

The operations computing system 102 can perform the operations and functions for managing autonomous vehicles to address traffic anomalies, as described herein. The operations computing system 104 can be located remote from the autonomous vehicle. For example, the operations computing system 104 can operate offline. The operations computing system 104 can include one or more distinct physical computing devices.

The operations computing system 104 can include one or more computing devices 134. The one or more computing devices 134 can include one or more processors 702 and a memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) can store data 706 that can be obtained, received, accessed, written, manipulated, created, and/or stored. The data 706 can include, for instance, sensor data, state data, prediction data, motion planning data, model input data, model output data, profile data, and/or other data or information as described herein. In some implementations, the operations computing system 104 can obtain data from one or more memory device(s) that are remote from the system 104.

The memory 704 can also store computer-readable instructions 708 that can be executed by the one or more processors 702. The instructions 708 can be software written in any suitable programming language or can be implemented in hardware. Additionally, or alternatively, the instructions 708 can be executed in logically and/or virtually separate threads on processor(s) 702.

For example, the memory 704 can store instructions 708 that when executed by the one or more processors 702 cause the one or more processors 702 to perform any of the operations and/or functions described herein, including, for example, any of the operations and functions of the operations computing system 104, the computing device(s) 134, and any of the operations and functions for which the operations computing system 104 and/or the computing device(s) 134 are configured, as described herein, as well as the operations for managing autonomous vehicles to address traffic anomalies (e.g., one or more portions of method 500).

According to an aspect of the present disclosure, the computing system 104 can store or include one or more machine-learned models 140. As examples, the machine-learned models 140 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks.

In some implementations, the operations computing system 104 can receive the one or more machine-learned models 140 from the machine learning computing system 730 over the network 780 and can store the one or more machine-learned models 140 in the memory 704. The operations computing system 704 can then use or otherwise implement the one or more machine-learned models 140 (e.g., by processor(s) 702). In particular, the operations computing system 104 can implement the machine learned model(s) 140 to determine recommended vehicle actions and vehicle action parameters to address traffic anomalies, build profiles for an operational mode, etc., as described herein.

The machine learning computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage media, such as RAM, ROM, EEPROM, EPROM, one or more memory devices, flash memory devices, etc., and combinations thereof.

The memory 734 can store information that can be accessed by the one or more processors 732. For instance, the memory 734 (e.g., one or more non-transitory computer-readable storage mediums, memory devices) can store data 736 that can be obtained, received, accessed, written, manipulated, created, and/or stored. In some implementations, the machine learning computing system 730 can obtain data from one or more memory device(s) that are remote from the system 730.

The memory 734 can also store computer-readable instructions 738 that can be executed by the one or more processors 732. The instructions 738 can be software written in any suitable programming language or can be implemented in hardware. Additionally, or alternatively, the instructions 738 can be executed in logically and/or virtually separate threads on processor(s) 732. The memory 734 can store the instructions 738 that when executed by the one or more processors 732 cause the one or more processors 732 to perform operations.

In some implementations, the machine learning computing system 730 can include one or more server computing devices. If the machine learning computing system 730 includes multiple server computing devices, such server computing devices can operate according to various computing architectures, including, for example, sequential computing architectures, parallel computing architectures, or some combination thereof.

In addition or alternatively to the model(s) 140 at the operations computing system 104, the machine learning computing system 730 can include one or more machine-learned models 740. As examples, the machine-learned models 740 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks, or other forms of neural networks. The machine-learned models 740 can be similar to and/or the same as the machine-learned models 140.

As an example, the machine learning computing system 730 can communicate with the operations computing system 104 according to a client-server relationship. For example, the machine learning computing system 730 can implement the machine-learned models 740 to provide a web service to the computing system 102. For example, the web service can provide machine-learned models to an entity associated with an autonomous vehicle; such that the entity can implement the machine-learned model (e.g., to determine recommended vehicle actions, recommended vehicle action parameters). Thus, machine-learned models 140 can located and used at the operations computing system 104 and/or machine-learned models 740 can be located and used at the machine learning computing system 730.

In some implementations, the machine learning computing system 730 and/or the operations computing system 104 can train the machine-learned models 140 and/or 740 through use of a model trainer 760. The model trainer 760 can train the machine-learned models 140 and/or 740 using one or more training or learning algorithms. One example training technique is backwards propagation of errors. In some implementations, the model trainer 760 can perform supervised training techniques using a set of labeled training data. In other implementations, the model trainer 760 can perform unsupervised training techniques using a set of unlabeled training data. The model trainer 760 can perform a number of generalization techniques to improve the generalization capability of the models being trained. Generalization techniques include weight decays, dropouts, or other techniques.

In particular, the model trainer 760 can train a machine-learned model 140 and/or 740 based on a set of training data 762. The training data 762 can include, for example, a number of sets of traffic data from previously observed driving logs and/or associated with previously existing traffic anomalies. In some implementations, the training data 762 can be taken from the same geographic area (e.g., city, state, and/or country) in which an autonomous vehicle utilizing that model 140 is designed to operate. In this way, models 140/740 can be trained to determine vehicle actions in a manner that is tailored to the driving customs of a particular location (e.g., by providing pedestrians more right of way in some locations than others). The model trainer 760 can be implemented in hardware, firmware, and/or software controlling one or more processors.

The operations computing system 104 can also include a network interface 710 used to communicate with one or more systems or devices, including systems or devices that are remotely located from the operations computing system 104. The network interface 710 can include any circuits, components, software, etc. for communicating with one or more networks (e.g., 780). In some implementations, the network interface 710 can include, for example, one or more of a communications controller, receiver, transceiver, transmitter, port, conductors, software and/or hardware for communicating data. Similarly, the machine learning computing system 730 can include a network interface 742.

The computing device(s) 790 of the vehicle computing system 101 can include processor(s) 792 and a memory 794. The one or more processors 792 can be any suitable processing device (e.g., a processor core, a microprocessor, an ASIC, a FPGA, a controller, a microcontroller, etc.) and can be one processor or a plurality of processors that are operatively connected. The memory 794 can include one or more non-transitory computer-readable storage media, such as RAM, ROM, EEPROM, EPROM, one or more memory devices, flash memory devices, etc., and combinations thereof.

The memory 794 can store information that can be accessed by the one or more processors 792. For instance, the memory 794 (e.g., one or more non-transitory computer-readable storage mediums, memory devices) on-board the vehicle 102 can include computer-readable instructions 796 that can be executed by the one or more processors 792. The instructions 796 can be software written in any suitable programming language or can be implemented in hardware. Additionally, or alternatively, the instructions 796 can be executed in logically and/or virtually separate threads on processor(s) 792.

For example, the memory 794 on-board the vehicle 102 can store instructions 796 that when executed by the one or more processors 792 on-board the vehicle 102 cause the one or more processors 792 (the computing system 101) to perform operations such as any of the operations and functions of the computing system 101, the vehicle 102, or for which the computing system 101 and/or the vehicle 102 are configured, as described herein, the operations for controlling an autonomous vehicle to address a traffic anomaly (e.g., one or more portions of method 600), and/or any other functions for the vehicle 102, as described herein.

The memory 794 can store data 798 that can be obtained, received, accessed, written, manipulated, created, and/or stored. The data 798 can include, for instance, traffic data, sensor data, state data, prediction data, motion planning data, data associated with operating modes, profile data, and/or other data/information, as described herein. In some implementations, the computing device(s) 790 can obtain data from one or more memory device(s) that are remote from the vehicle 102.

The computing device(s) 790 can also include a communication interface 799 used to communicate with one or more other system(s) on-board the vehicle 102 and/or a remote computing device that is remote from the vehicle 102. The communication interface 799 can include any circuits, components, software, etc. for communicating with one or more networks (e.g., 780). In some implementations, the communication interface 799 can include including for example, one or more of a communications controller, receiver, transceiver, transmitter, port, conductors, software and/or hardware for communicating data.

The network(s) 780 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 780 can be accomplished, for instance, via a network interface using any type of protocol, protection scheme, encoding, format, packaging, etc.

FIG. 7 illustrates one example system 700 that can be used to implement the present disclosure. Other computing systems can be used as well. For example, in some implementations, the operations computing system 104 can include the model trainer 760 and the training dataset 762. In such implementations, the machine-learned models 140 can be both trained and used locally at the operations computing system 104. As another example, in some implementations, the operations computing system 104 is not connected to other computing systems.

In addition, components illustrated and/or discussed as being included in one of the computing systems 104 or 730 can instead be included in another of the computing systems 104 or 730. Moreover, computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

What is claimed is:

1. A computer-implemented method of managing autonomous vehicles to address traffic anomalies, comprising:
    detecting, by a computing system comprising one or more computing devices, an existence of a traffic anomaly within a geographic area;
    determining, by the computing system, at least one autonomous vehicle to address the traffic anomaly within the geographic area; and
    providing, by the computing system, a communication to the at least one autonomous vehicle instructing the autonomous vehicle to enter into a traffic reduction operation mode to address the traffic anomaly,
    wherein the traffic reduction operation mode is based at least in part on a profile associated with the traffic reduction operation mode, wherein the profile associated with the traffic reduction operation mode is stored onboard the at least one autonomous vehicle, and wherein the at least one autonomous vehicle is configured to operate in the traffic reduction operation mode.

2. The computer-implemented method of claim 1, further comprising:
    generating, by the computing system, the profile associated with the traffic reduction operation mode; and
    providing, by the computing system, data indicative of the profile associated with the traffic reduction operation mode to the at least one autonomous vehicle.

3. The computer-implemented method of claim 1, wherein generating, by the computing system, the profile associated with the traffic reduction operation mode comprises:
obtaining, by the computing system, traffic data associated with one or more of a plurality of autonomous vehicles;
obtaining, by the computing system, data indicative of a machine-learned model;
inputting, by the computing system, the traffic data into the machine-learned model; and
receiving, by the computing system, data indicative of one or more vehicle actions as an output of the machine-learned model.

4. The computer-implemented method of claim 3, wherein the output of the machine-learned model further comprises one or more vehicle action parameters associated with the one or more vehicle actions.

5. The computer-implemented method of claim 4, wherein the profile comprises the one or more vehicle actions and the one or more vehicle action parameters associated with the one or more vehicle actions.

6. The computer-implemented method of claim 3, wherein the traffic data is based at least in part on data captured via at least one of a positioning system or an inertial measurement unit of an autonomous vehicle.

7. The computer-implemented method of claim 1, wherein detecting, by the computing system, the existence of the traffic anomaly within the geographic area comprises:
obtaining, by the computing system, traffic data from the at least one autonomous vehicle; and
determining, by the computing system, the existence of the traffic anomaly within the geographic area based at least in part on the traffic data.

8. The computer-implemented method of claim 1, wherein detecting, by computing system, the existence of the traffic anomaly within the geographic area comprises:
receiving, by the computing system, data indicative of a potential traffic anomaly from the at least one autonomous vehicle; and
determining, by the computing system, the existence of the traffic anomaly within the geographic area based at least in part on the data indicative of the potential traffic anomaly.

9. The computer-implemented method of claim 1, further comprising:
determining, by the computing system, an effectiveness of the at least one autonomous vehicle on the traffic anomaly; and
adjusting, by the computing system, the profile associated with the traffic reduction operation mode based at least in part on the effectiveness of the at least one autonomous vehicle on the traffic anomaly.

10. A computing system for managing autonomous vehicles to address traffic anomalies, comprising:
one or more processors; and
one or more tangible, non-transitory, computer readable media that collectively store instructions that when executed by the one or more processors cause the computing system to perform operations, the operations comprising:
detecting an existence of a traffic anomaly within a geographic area;
identifying a plurality of autonomous vehicles that are proximate to the geographic area;
determining at least one autonomous vehicle to address the traffic anomaly; and
providing a communication to the at least one autonomous vehicle instructing the autonomous vehicle to enter into a traffic reduction operation mode, wherein the traffic reduction operation mode is based at least in part on a profile stored onboard the autonomous vehicle, and wherein the profile is based at least in part on a machine-learned model.

11. The computing system of claim 10, wherein the operations further comprise:
obtaining traffic data associated with one or more of the plurality of autonomous vehicles;
obtaining data descriptive of a machine-learned model;
inputting the traffic data into the machine-learned model; and
receiving data indicative of one or more vehicle actions associated with the geographic area as an output of the machine-learned model.

12. The computing system of claim 11, wherein the profile associated with the traffic reduction operation mode is based at least in part on the output of the machine-learned model.

13. The computing system of claim 10, wherein the operations comprise:
providing, for storage onboard the autonomous vehicle, data indicative of the profile associated with the traffic reduction operation mode to the at least one autonomous vehicle.

14. The computing system of claim 10, wherein determining the at least one autonomous vehicle to address the traffic anomaly comprises:
determining whether the at least one autonomous vehicle is currently providing a vehicle service.

15. The computing system of claim 10, wherein each of the plurality of autonomous vehicles is within a threshold distance from a location of the traffic anomaly.

16. The computing system of claim 10, wherein the at least one autonomous vehicle is configured to provide a vehicle service, and wherein determining the at least one autonomous vehicle to address the traffic anomaly comprises:
comparing a cost associated with the at least one autonomous vehicle providing the vehicle service to a cost associated with the at least one autonomous vehicle travelling to address the traffic anomaly.

17. An autonomous vehicle comprising:
a profile associated with a traffic reduction operation mode stored onboard the autonomous vehicle, the profile comprising one or more vehicle actions and one or more vehicle action parameters associated with the one or more vehicle actions;
one or more processors; and
one or more tangible, non-transitory, computer readable media that collectively store instructions that when executed by the one or more processors cause the one or more processors to perform operations, the operations comprising:
receiving, from a remote computing device that is remote from the autonomous vehicle, a communication instructing the autonomous vehicle to enter into the traffic reduction operation mode;
accessing data indicative of the profile associated with the traffic reduction operation mode stored onboard the autonomous vehicle; and
determining a motion plan for the autonomous vehicle based at least in part on the profile associated with the traffic reduction operation mode.

18. The autonomous vehicle of claim 17, wherein the autonomous vehicle further comprises a control system for controlling a motion of the autonomous vehicle, and wherein the operations further comprise:

controlling, via the control system, a motion of the autonomous vehicle based at least in part on the motion plan for the autonomous vehicle.

19. The autonomous vehicle of claim 17, wherein the autonomous vehicle is travelling within a geographic area that comprises a traffic anomaly.

20. The autonomous vehicle of claim 19, wherein the operations further comprise:

providing, to the remote computing device that is remote from the autonomous vehicle, a communication requesting permission to enter into the traffic reduction operation mode.

* * * * *